E. OLSON.
COVER FOR COOKING VESSELS.
APPLICATION FILED AUG. 16, 1919.
1,345,457.
Patented July 6, 1920.
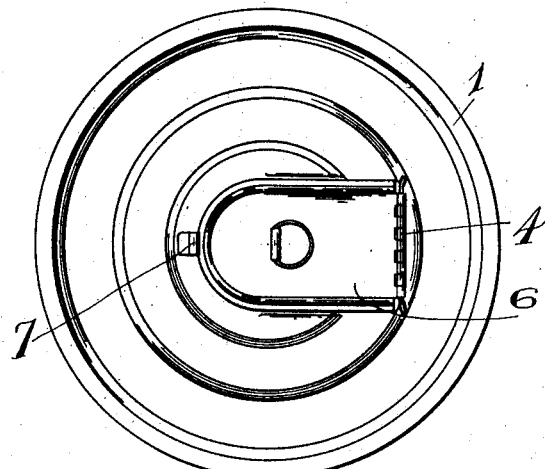
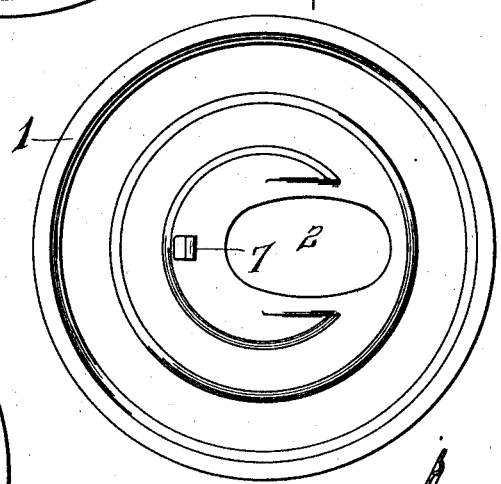
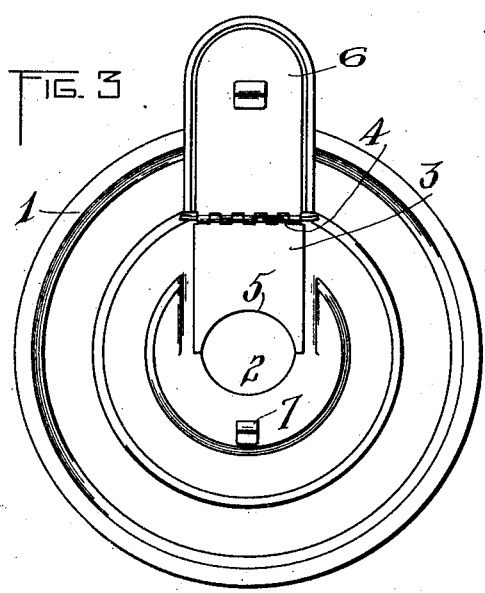
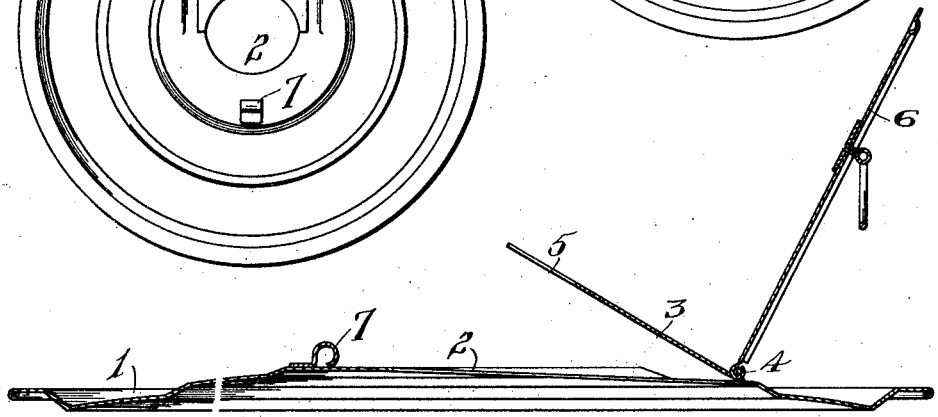
INVENTOR.
Emil Olson
BY Davis Fehrman
his ATTORNEYS.

UNITED STATES PATENT OFFICE.

EMIL OLSON, OF ROCHESTER, NEW YORK.

COVER FOR COOKING VESSELS.

1,345,457.  Specification of Letters Patent.  Patented July 6, 1920.

Application filed August 16, 1919. Serial No. 318,035.

*To all whom it may concern:*

Be it known that I, EMIL OLSON, a citizen of the United States, and resident of Rochester, in the county of Monroe and State of New York, have invented certain new and useful Improvements in Covers for Cooking Vessels, of which the following is a specification.

The present invention relates to covers for cooking vessels and an object thereof is to provide a cover which has provision for the insertion of an egg beater or the like therethrough so that the cover may act as a guard during the beating of the eggs or other material to stop the splash of the material, provision being made whereby the beater may be readily passed through the cover and then the opening through which the beater is passed may be restricted in size to permit the operation of the beater while preventing the escape of any of the material and provision also being made whereby the opening may be entirely closed so that the cover may be used as an ordinary cover.
To these and other ends, the invention consists of certain parts and combinations of parts, all of which will be hereinafter described, the novel features being pointed out in the appended claims.
In the drawings:

Figure 1 is a plan view of a cover showing the opening closed;

Fig. 2 is a plan view of the cover showing the pivoted members removed;
Fig. 3 is a plan view showing one of the pivoted members in open position, and the other pivoted member in its position restricting the size of the opening; and Fig. 4 is a sectional view through the cover showing the two pivoted members partially swung away from the opening.

In the embodiment herein shown 1 indicates the cover body which may be made in various sizes to fit different vessels. This body is provided with an opening 2 preferably elongated in form and eccentrically arranged in the cover body. This opening is of a size to permit an egg beater or similar utensil to be passed therethrough.
Means is provided on the cover for restricting the size of this opening so that the restricted opening will be of a size to permit the handle of the egg beater to extend above the top of the cover. This restricting means in this instance is in the form of a member 3 hinged at 4 to the top surface of the cover body 1 and having a notched end 5 with which one end of the opening 2 forms the restricted opening.

There has also been associated with the cover, means for covering the opening 2 and also preferably covering the opening restricting device 3. This means in this instance is in the form of a member 6 pivoted at 4 in common with the member 3 and adapted to be engaged at its free end by a spring latch 7 secured on the cover near one end of the opening 2. This member 6 covers up the restricted member 3 and also the opening 2, thus permitting the cover to be used for cooking vessels.

From the foregoing it will be seen that there has been provided a combined cover and splash guard. This cover may be used for vessels during cooking and the opening therethrough is then entirely closed. When using the cover as a splash guard the two hinged members 3 and 6 are swung to extreme open positions so that the egg beater may be introduced through the opening 2 after which the member 3 is swung to the position shown in Fig. 3 to restrict the size of the opening about the handle of the egg beater. In this condition, the cover will effectively act as a guard to prevent the splash from the material passing from the vessel in which the beating operation is taking place.

What I claim as my invention and desire to secure by Letters Patent is:

1. A combined cover and splash guard comprising a cover member having an elongated opening intersecting the center of said cover and projecting farther from the center on one side than the other, means for closing said opening, and separate means for covering the end of the opening farthest removed from the center to restrict the opening to the center of the cover.

2. A combined cover and splash guard comprising a cover member having an elongated opening intersecting the center of said cover and projecting farther from the center on one side than the other, means for closing said opening, and a hinged member arranged to close off the end of the opening farthest removed from the center to restrict the opening to the center of the cover.

3. A combined cover and splash guard comprising a cover member having an opening, means for restricting the size of the opening, and a hinged member arranged to close the opening.

4. A combined cover and splash guard comprising a cover member having an opening, and two members, one arranged to restrict the size of the opening and one arranged to cover the first named member and the opening.

5. A combined cover and splash guard comprising a cover member having an elongated opening eccentrically arranged therein, two members mounted to swing about a common axis at one end of the opening, one of said members being formed to restrict the size of the opening and the other of said members being adapted to cover the first named member and the opening.

EMIL OLSON.